United States Patent
Nicholson et al.

(10) Patent No.: US 10,706,628 B2
(45) Date of Patent: Jul. 7, 2020

(54) CONTENT TRANSFER

(71) Applicant: Lenovo (Singapore) Pte. Ltd., Singapore (SG)

(72) Inventors: John Weldon Nicholson, Cary, NC (US); Ming Qian, Cary, NC (US); Jun-Ki Min, Chicago, IL (US); Mir Farooq Ali, Rolling Meadows, IL (US); Song Wang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/908,174

(22) Filed: Feb. 28, 2018

(65) Prior Publication Data

US 2019/0266801 A1    Aug. 29, 2019

(51) Int. Cl.
| | |
|---|---|
| G06T 19/00 | (2011.01) |
| G06F 3/01 | (2006.01) |
| G06F 3/16 | (2006.01) |

(52) U.S. Cl.
CPC ............ G06T 19/006 (2013.01); G06F 3/013 (2013.01); G06F 3/017 (2013.01); G06F 3/167 (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 2007/0097832 A1* | 5/2007 | Koivisto | ................. | A63H 30/04 369/63 |
| 2011/0307841 A1* | 12/2011 | Boldyrev | ................ | G06F 9/542 715/863 |
| 2016/0019212 A1* | 1/2016 | Soldani | ................. | G06F 16/434 345/633 |
| 2016/0027216 A1* | 1/2016 | da Veiga | ............ | G02B 27/0172 345/419 |
| 2016/0196693 A1* | 7/2016 | Kobayashi | ............ | G06T 19/006 345/633 |
| 2017/0053042 A1* | 2/2017 | Sugden | ............... | H04N 5/23229 |
| 2017/0221265 A1* | 8/2017 | Lin | ........................ | G06T 19/006 |
| 2017/0285758 A1* | 10/2017 | Hastings | ................. | G06F 3/011 |
| 2017/0344124 A1* | 11/2017 | Douxchamps | ........ | G06T 19/006 |
| 2018/0054487 A1* | 2/2018 | Hebsur | ............... | G06F 3/04847 |
| 2018/0063924 A1* | 3/2018 | Alfier | ................. | H05B 37/0272 |
| 2018/0091869 A1* | 3/2018 | Krishna | ............... | H04N 21/812 |
| 2018/0131907 A1* | 5/2018 | Schmirler | .......... | H04N 5/23238 |
| 2018/0139203 A1* | 5/2018 | Dolan | ................. | H04L 63/0861 |
| 2018/0219975 A1* | 8/2018 | Leppanen | ........... | G06F 3/04815 |

\* cited by examiner

*Primary Examiner* — Phong X Nguyen
(74) *Attorney, Agent, or Firm* — Ference & Associates LLC

(57) ABSTRACT

One embodiment provides a method, including: receiving, at an augmented reality system, a user command to select content associated with at least one of a device and the augmented reality system; receiving, at the augmented reality system, another user command to transfer the content to another device; and transferring, responsive to receiving the another user command to transfer the content, the content to the another device. Other aspects are described and claimed.

12 Claims, 3 Drawing Sheets

CONTENT TRANSFER

BACKGROUND

Information handling devices ("devices"), for example smart phones, tablet devices, head-mounted displays ("HMDs"), laptop and personal computers, and the like, may be capable of transmitting content to and receiving content from other devices. The content transfer task may be initiated responsive to receiving some type of user command input, e.g., a voice command, a touch command, a gesture command, and the like.

BRIEF SUMMARY

In summary, one aspect provides a method, comprising: receiving, at an augmented reality system, a user command to select content associated with at least one of a device and the augmented reality system; receiving, at the augmented reality system, another user command to transfer the content to another device; and transferring, responsive to receiving the another user command to transfer the content, the content to the another device.

Another aspect provides an information handling device, comprising: a display of an augmented reality system; a processor; a memory device that stores instructions executable by the processor to: receive a user command to select content associated with at least one of a device and the augmented reality system; receive another user command to transfer the content to another device; and transfer, responsive to receiving the another user command to transfer the content, the content to the another device.

A further aspect provides a product, comprising: a storage device that stores code, the code being executable by a processor and comprising: code that receives a user command to select content associated with at least one of a device and an augmented reality system; code that receives another user command to transfer the content to another device; and code that transfers, responsive to receiving the another user command to transfer the content, the content to the another device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
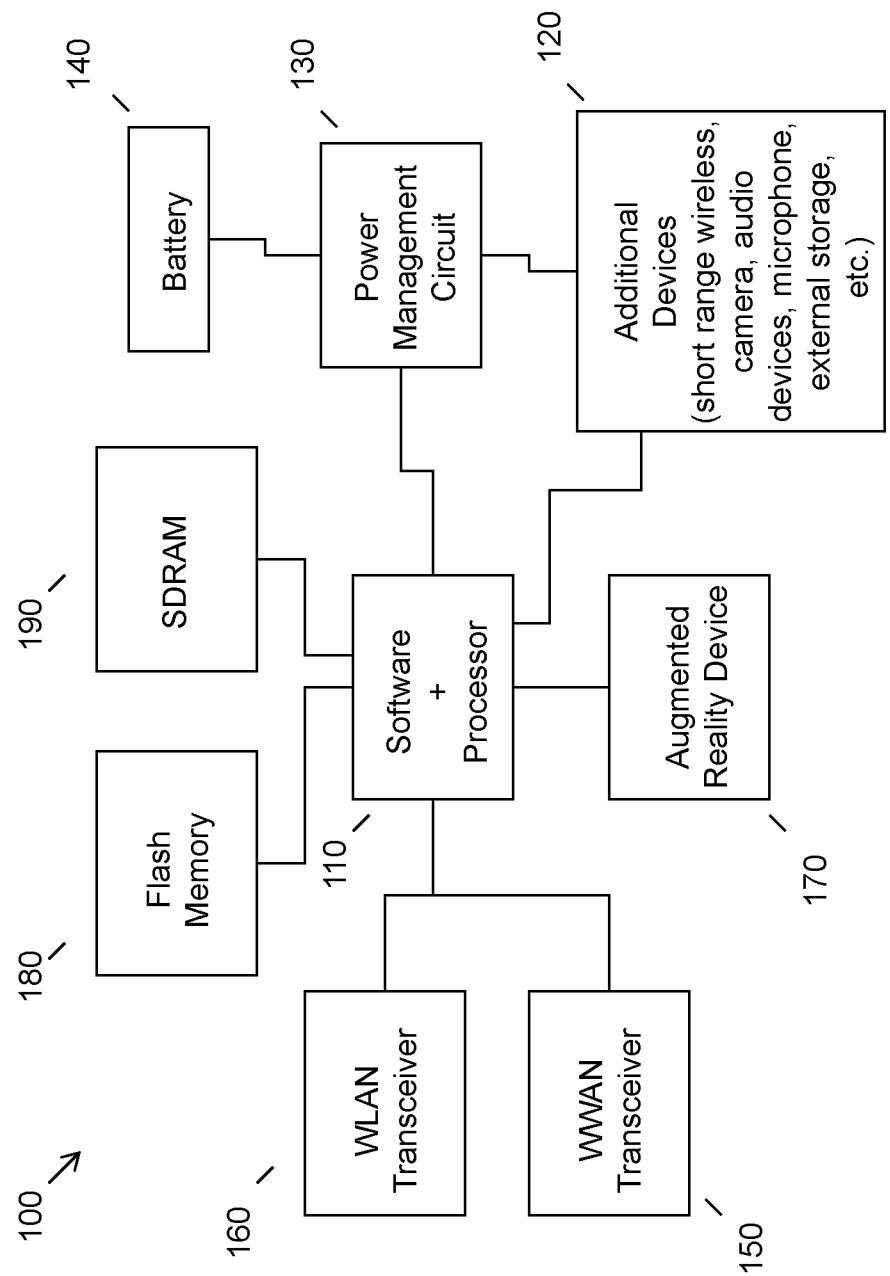
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, content is transferred digitally between two electronic devices. For example, a user may point their smart phone camera at a computer screen to transfer an electronic document between the two devices. In another example, gaze detection may be utilized to first identify a target device a user wishes to transfer content to and thereafter, upon receipt of a voice command, the content may be transferred from an originating device to the target device. In both of these examples, the transfer of content takes place solely in the digital world.

However, situations often arise where content in the physical world needs to be transferred to the digital world, and vice versa. For example, a nurse may use an analog or disconnected thermometer to take the temperature of a patient. Subsequent to taking this temperature, in order to transfer the temperature reading to a virtual form field (e.g., a patient's medical form on a computer terminal, etc.), a nurse may first transcribe the temperature reading (e.g., on a notepad, etc.) and thereafter input the transcribed information (e.g., manually by typing, etc.) into the virtual form field. As another example, a user may have digital content (e.g., a document, etc.) that they may want to transfer into the physical world (e.g., by printing, etc.). In this situation, a user may need to provide one or more user inputs and/or utilize multiple devices to effectuate the transfer.

In all of the aforementioned examples, although the intended transfer function is eventually executed, the process may be time-consuming, non-intuitive, and burdensome. As such, current solutions do not provide an elegant way of transferring content between the physical world and the digital world as well as transferring virtual/physical content across all devices (i.e., not just a user's connected devices, but to public devices and to devices belonging to other individuals).

Accordingly, an embodiment provides a method of transferring content between the physical world and the digital world, as well as transferring virtual/physical content across all devices (i.e., not just a user's connected devices, but to public devices and to devices belonging to other individuals), using an augmented reality ("AR") system. In an embodiment, an AR system may receive a user command to select content from a device or a device supporting the AR system (e.g., a wearable AR headset, etc.). In an embodiment, the AR system may receive another user command to transfer the selected content to a target device. Responsive to receiving the transfer command and identifying a target device or target individual, an embodiment may transfer the content to the target device or a device associated with the target individual. Such a method may apprise the user of the input capabilities and/or other aspects of a particular electronic device prior to the user attempting to provide input to the electronic device.

As an example implementation of the aforementioned embodiments, the nurse in the previous example may be wearing an AR headset. Instead of transcribing the temperature reading and then inputting the temperature into a digital form field, the nurse may first perform a "grab" gesture (e.g., a pinching motion of the fingers, etc.) overtop the temperature reading to select the temperature information. The selection of the temperature information may be visually confirmed to the nurse on her AR headset (e.g., by highlighting the temperature on a display of the AR headset, displaying the temperature on a portion of a display of the AR headset, etc.). The nurse may then transfer the selected temperature information to a virtual form field of a computer by performing a "drop" gesture (e.g., a finger separation motion, etc.) overtop the virtual form field.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
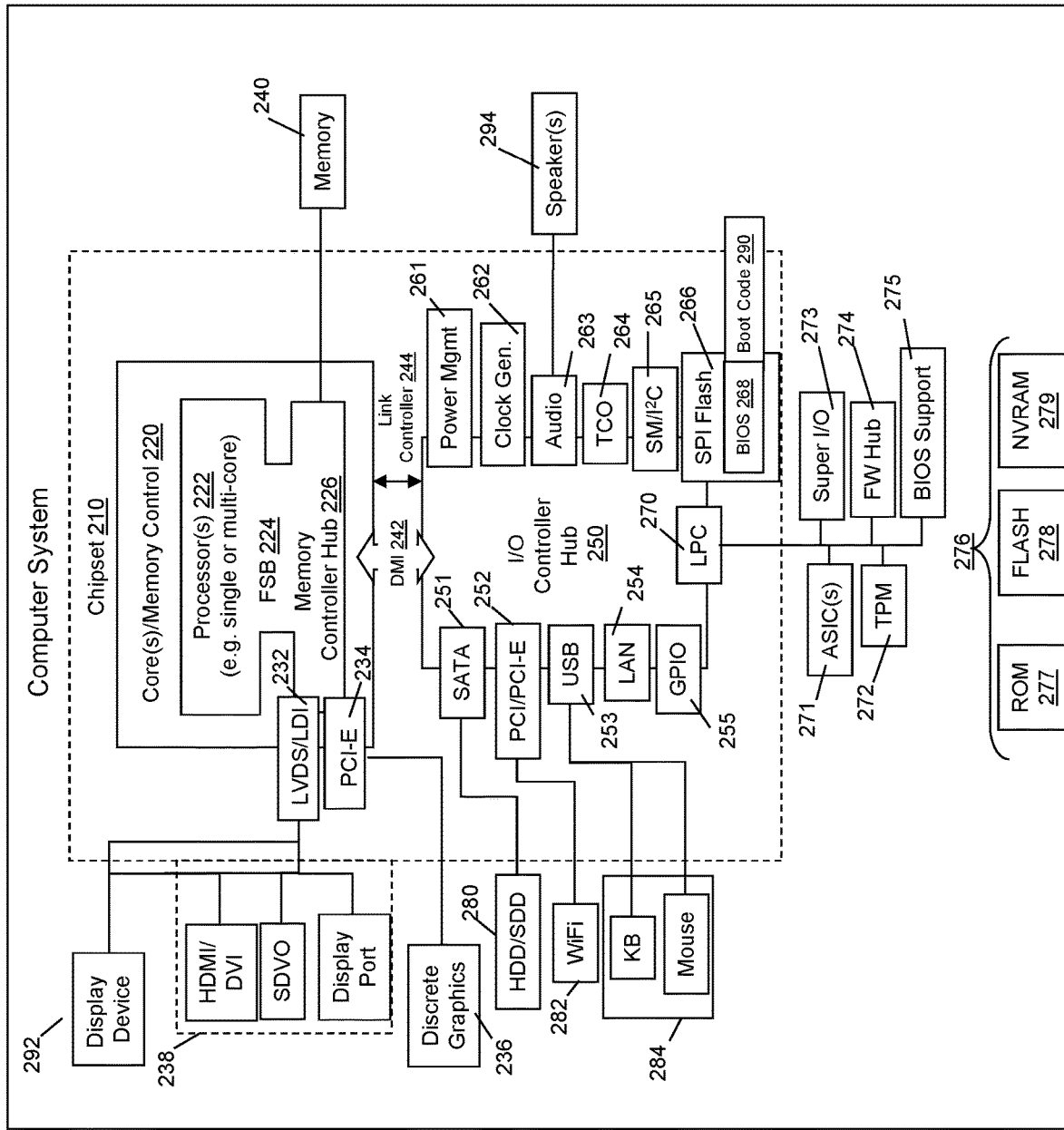
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, wearable headsets, personal computer devices generally, and/or electronic devices that are capable of displaying augmented reality content and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
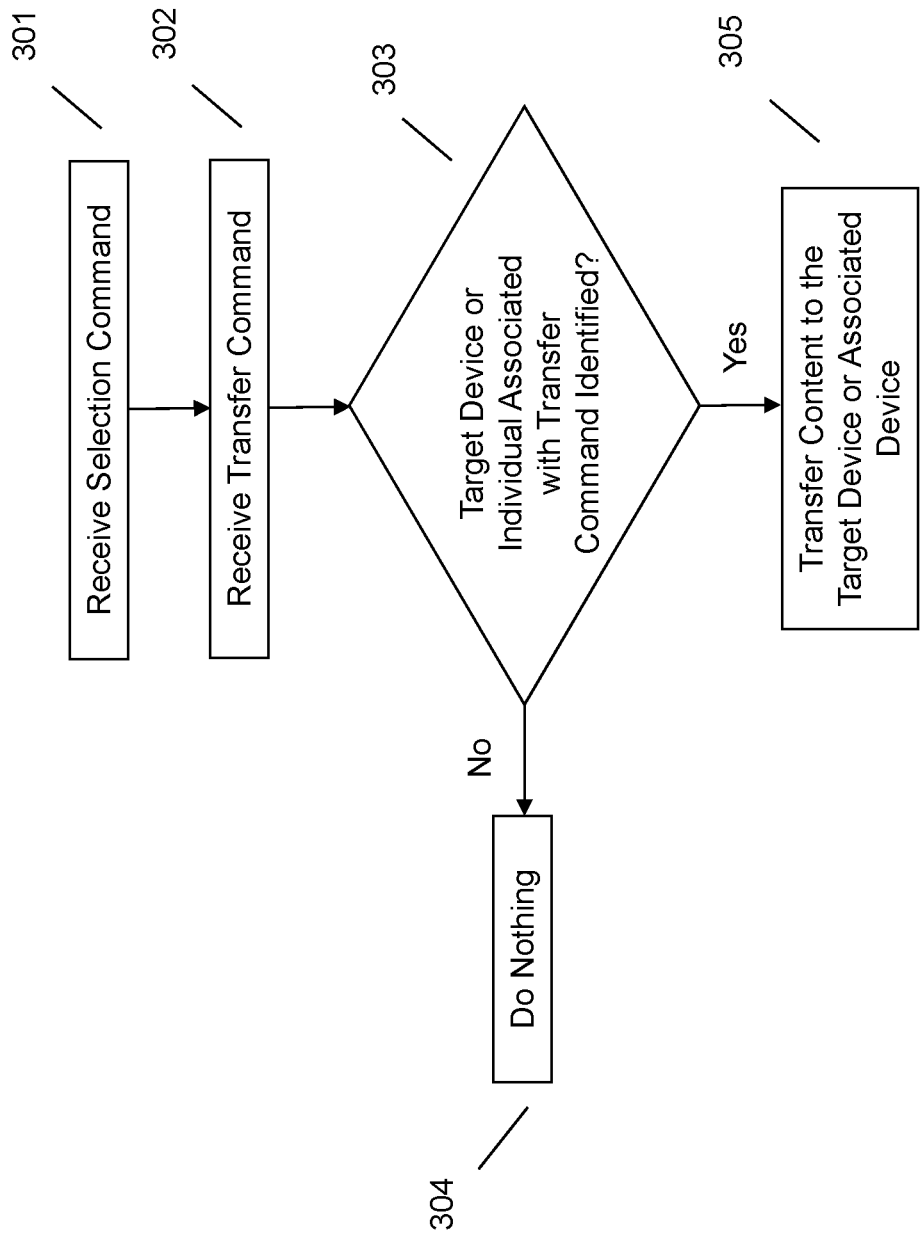
FIG. 3 illustrates an example method of transferring content between devices using an augmented reality system.

Referring now to FIG. 3, an embodiment may transfer content between devices using an AR system. At 301, an embodiment may receive, at an AR system, a user command to select content associated with at least one of a device and the AR system. In the context of this application, "content" may refer to virtually any piece of information capable of being selected/captured by a user such as a digital file, a digital document, a captured image of the physical world, other types of digital information, and the like. In the context of this application, a "device" may be virtually any electronic device such as a computer, a television, a smart phone or tablet, other electronic devices, and the like. In an embodiment, the AR system may be embodied on a user device capable of displaying augmented reality ("AR") content such as an AR headset (e.g., Google Glass®, Microsoft Hololens®, etc.), smart phone, tablet, and the like. For simplicity purposes, the majority of the discussion herein will involve AR content displayed on an AR headset. However, it should be understood that generally any AR-capable device may be utilized to display AR content.

In the context of this application the user command input may be a command provided using virtually any input form. For example, the user command may be a gesture command, a verbal command, a touch-based command, a combination thereof, and the like. In an embodiment, the command input may be received/detected by an input device (e.g., an image capture device, a video capture device, an audio capture device, touch-based display surface, physical or on-screen keyboard, etc.) operatively coupled to or in communication with the AR system and may thereafter be recognized and processed by at least one processor.

In an embodiment, the user command may be directed to selection of content on either the user's own AR device or on another device. For example, a user may wish to select content projected on their AR headset. In this situation, a user may perform a "grab" gesture (e.g., a pinching motion of the fingers, etc.) on or in the proximity of the content they wish to select. One or more sensors of the AR system may be able to detect the location of the user's gesture and thereafter correlate that location to the projected content. Additionally and/or alternatively, a user may provide a secondary command input (e.g., an audible command, etc.) during, or within a predetermined time of (e.g., 5 seconds, 10 seconds, etc.), the provision of the first command input to provide further confidence to the system of the content the user wishes to select. For example, a user may wish to select a particular application window (e.g., titled "Window X") displayed on their AR headset. The user may perform a grab gesture on Window X and also provide the audible command, "select Window X" or simply say "Window X" while the grab gesture is being performed or shortly before or after the grab gesture is performed.

In an embodiment, a user may wish to select content on another device. For example, a user may wish to select a particular application window displayed on their laptop. Similar to the aforementioned example, a user may perform a grab gesture overtop of or in proximity to the application window. In this situation, the AR headset may communicate to the laptop the position on the display screen the user's grab gesture was performed on top of or proximate to. Responsive to receiving this communication, the laptop may identify the intended application window for selection by correlating the position of the grab gesture to a corresponding file displayed on the screen. For example, the AR headset may communicate to the laptop that the grab gesture was performed near the bottom-right portion of the laptop's display screen. The laptop may thereafter determine whether an application window is being displayed at the bottom-right portion of the screen. In another embodiment, sensors integral to the laptop may be able to detect the position of the user's gesture and thereafter correlate the position of the gesture with a piece of content. As in the examples mentioned in the previous paragraph, a secondary command input (e.g., an audible command, etc.) may also be provided to increase the confidence of the precise content the user wishes to select.

In an embodiment, the device a user wishes to select content from and/or the identified content for selection may be visually distinguished to the user from other devices and/or other content. For example, with respect to the selection of content on another device, the other device may be located proximate to or among other electronic devices (e.g., a laptop may be located next to a television, etc.). The actual device a user intends to select content from may be identified (e.g., using one or more gaze tracking methods known in the art, using the location and/or direction of a user gesture, using received voice input, etc.) and thereafter visually distinguished to a user on their AR headset (e.g., edges of the identified device may be highlighted, the identified device may be shaded a particular color, an indicator symbol may be positioned next to the device, etc.). For example, if a user wished to select content from the laptop instead of the television, based on the direction of a user's gaze an embodiment may identify that a user is looking at the laptop and may thereafter highlight the edges of the laptop. In a similar vein, an intended piece of content a user wishes to select may also be visually distinguished to the user. For example, a laptop may have a plurality of windows open on its display screen. Responsive to identifying the application window a user desires to select, an embodiment may highlight the application window.

At 302, an embodiment may receive another user command to transfer the selected content to another device. Similar to the first user command, in the context of this application the transfer command input may be a command provided using virtually any input form (e.g., gesture command, a verbal command, a touch-based command, a combination thereof, and the like). Additionally, the transfer command input may also be received/detected by an input device (e.g., an image capture device, a video capture device, an audio capture device, touch-based display surface, physical or on-screen keyboard, etc.) operatively coupled to or in communication with the AR system and may thereafter be recognized and processed by at least one processor. In an embodiment, the target device may be virtually any electronic device, including the user's AR headset, which is capable of receiving digital content. In an embodiment, a target for content transfer may not only be a device, but may also be another individual. For example, a transfer command may be performed with respect to a physical individual. Content may thereafter be transferred to a device or communication address (e.g., email address, phone number, text messaging, another communication service, etc.) associated with that physical individual.

As a non-limiting example, the transfer command may be a gesture command such as a user un-pinching their fingers over the target device, a user un-pinching their fingers over top of a virtual form field, a user un-pinching their fingers over top another individual, etc. An embodiment may recognize that the transfer command corresponds to an immediately preceding selection command. For example, if a user performs a selection command over top an image on a laptop and thereafter performs a transfer command over top a tablet, an embodiment may identify that the transfer command corresponds to the selected image on the laptop. In another embodiment, the transfer command may be a continuous extension of the selection command. For example, a user may first select content by pinching their fingers and, while keeping their fingers pinched, move their hand overtop the target device and only then un-pinch their fingers. In an embodiment, if a transfer command is not received within a predetermined time frame (e.g., 10 seconds, 1 minute, etc.) from receipt of a selection command, an embodiment may "de-select" the originally selected content. In an embodiment, the target device, target virtual form field, or target individual may also be visually distinguished to the user (e.g., highlighted, etc.) on their AR headset.

Subsequent to identifying a selected piece of content, an embodiment may make a copy of the content. For example, responsive to identifying that a user wishes to select a particular image displayed on a laptop, an embodiment may cut or copy the image data (e.g., to a background application such as a clipboard, etc.). Responsive to receiving the transfer command, the cut or copied data may either be transferred to an intermediary device or it may be transferred directly to the destination device. In an embodiment, the intermediary device may be the user's AR device. In such a situation, content may first be transferred from the originating device to the user's AR device and thereafter transferred from the user's AR device to the target device upon receipt of a transfer command. In an embodiment, the transfer may be a direct transfer between the origin and target devices. For example, after performing the transfer command on a target device, the user's AR device may identify the target device the transfer command was performed on and communicate this information to the origin device. Responsive to receiving this information, the origin device may initiate a communication with the target (if such a communication is possible) and transfer the data to the target device through a communication channel (e.g., wired or wireless communication channel, etc.).

Responsive to not identifying, at 303, another device or individual to transfer the content to, an embodiment may, at 304, take no further action. Alternatively, an embodiment may provide a user with a notification that a target device could not be identified. Responsive to identifying, at 303, another device or individual to transfer content to, an embodiment may transfer, at 305, the content.

In an embodiment, the selected content may be transferred to a target device. In an embodiment, the transfer may be a copy of the content to the target device or may be a complete repositioning of the content. In the case of the latter, the transfer of content may lead to the removal of the content from the origin device. In an embodiment, the selected content may be transferred into a virtual object provided on a display of the AR system if the AR system is the target device. For example, a user may have a virtual form field displayed on their AR headset. An embodiment may transfer the content directly into the form field responsive to receiving a transfer gesture proximate to the form field.

As briefly mentioned above, an embodiment may transfer content to a device or communication address associated with another individual. An embodiment may first identify an individual (e.g., by capturing and analyzing an image of the individual, receiving user identification data from a device associated with the individual, etc.) to identify devices or addresses associated with that individual, where the associations may be stored in an accessible list. Responsive to identifying the individual, an embodiment may transfer the content to a predetermined or designated device or address. For example, a user may wish to send an image stored on the user's laptop to another individual. The user may select the image from the laptop (e.g., using a pinching gesture, etc.) and perform a transfer gesture overtop the other individual. An embodiment may identify the other individual and identify whether at least one device or communication address is associated with that individual (e.g., by accessing a contact list comprising a listing of devices and/or communication addresses associated with the identified contact's name, etc.). Responsive to identifying at least one associated device or communication address, an embodiment may then transfer the image to at least one of the devices or communication addresses. In a situation where an identified individual has a plurality of associated devices or addresses, a user may provide additional and/or simultaneous elaboration input. For example, while performing the transfer command overtop the other individual, a user may simultaneously provide audible input such as "email image", "text image", "Individual X's phone", and the like. An embodiment may then transfer the content to the designated location.

Responsive to not identifying the individual or not identifying a device or address associated with an identified individual, an embodiment may notify the user. Additionally and/or alternatively, an embodiment may prompt the user for additional identifying information (e.g., with a menu displayed using the AR system, etc.). For example, a menu comprising one or more input fields may be provided that a user may provide additional identifying information into (e.g., the identify of an unidentified individual, one or more devices or communication addresses associated with an identified individual, etc.).

In an embodiment, the selected content may be transferred to the target device or individual only after identifying that the target is authorized to receive the content. For example, a user may wish to transfer sensitive content between two devices. An embodiment may only transfer the sensitive content upon determining that the target device is authorized to receive the content. Additionally or alternatively, an embodiment may not allow a user to even attempt a transfer motion unless the user is identified as being authorized to transfer content. An embodiment may make these authorization determinations using one or more conventional authorization techniques. Responsive to determining that the user, target device, or target individual is not authorized to transfer or receive the content, an embodiment may do nothing, provide a notification to the user, show a menu of potential options (e.g., a menu to provide authorization information such as a username and password, etc.), and the like.

In an embodiment, responsive to receiving the content, the target device may automatically perform a function without receiving additional user input. In an embodiment, the function may be based upon the type, or underlying nature, of the electronic device. For example, a user may transfer an image from a laptop computer to a printer. Responsive to receiving the transferred image, the printer may automatically print the image. In a similar vein, an embodiment may automatically display the transferred content on a display of the target device. For example, a user may transfer a video file from a tablet to a television. The video file may be "casted" to the television and automatically displayed and/or played.

The various embodiments described herein thus represent a technical improvement to conventional content transfer techniques. Using the techniques described herein, an embodiment may receive a selection command and a transfer command at an augmented reality system, such as an AR headset. The commands may correspond to the selection and transfer of a piece of digital content (e.g., an image, a file, a video, etc.). Responsive to identifying a target device or individual, an embodiment may transfer the content to the target device. Throughout the transfer process, visual indications may be provided to the user on their AR device (e.g., selected content may be highlighted, an identified origin or target device may be highlighted, a notification may be displayed, etc.). Such techniques enable a user to utilize intuitive actions and gestures to transfer content between devices as well as to translate content from the physical world to the digital world and vice versa.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method performed by an augmented reality device, comprising:
   detecting a user command to select an article of virtual data displayed on a display screen of another device, wherein the article is within a field of view of the augmented reality device and wherein the user command is a gesture command;
   communicating, to the another device, an intention to select the article, wherein the communicating the intention comprises:
      identifying a location of the gesture command with respect to a physical position on the display screen, wherein the physical position on the display screen corresponds to a digital position of the article; and
      providing, to the another device, an indication of the physical position;
   detecting another user command to transfer the article to the augmented reality device, wherein the another user command is performed within a predetermined time of the user command;
   communicating, to the another device, an indication of the another user command to transfer; and
   receiving, from the another device, the article of virtual data.

2. The method of claim 1, wherein the gesture command is a non-touch gesture command and wherein the another user command is another non-touch gesture command.

3. The method of claim 1, further comprising detecting the another device using gaze tracking.

4. The method of claim 1, further comprising visually distinguishing, on a display of the augmented reality device, the selected article using a visual indicator.

5. The method of claim 1, wherein the receiving comprises inputting the article into a virtual object provided on a display of the augmented reality device.

6. The method of claim 1, wherein the receiving comprises receiving the article responsive to identifying that the augmented reality device is authorized to receive the article.

7. An information handling device, comprising:
a display;
a processor;
a memory device that stores instructions executable by the processor to:
detect a user command to select an article of virtual data displayed on a display screen of another device, wherein the article is within a field of view of the display of the information handling device and wherein the user command is a gesture command;
communicate, to the another device, an intention to select the article, wherein the instructions executable by the processor to communicate comprise instructions executable by the processor to:
identify a location of the gesture command with respect to a physical position on the display screen of the another device, wherein the physical position on the display screen of the another device corresponds to a digital position of the article; and
provide, to the another device, an indication of the physical position;
detect another user command to transfer the article to the information handling device, wherein the another user command is performed within a predetermined time of the user command;
communicate, to the another device, an indication of the another user command to transfer; and
receiving, at the information handling device and from the another device, the article of virtual data;
wherein the information handling device is an augmented reality device.

8. The information handling device of claim 7, wherein the gesture command is a non-touch gesture command and wherein the another user command is another non-touch gesture command.

9. The information handling device of claim 7, wherein the instructions are further executable by the processor to visually distinguish, on the display of the information handling device, the selected article using a visual indicator.

10. The information handling device of claim 7, wherein the instructions executable by the processor to receive comprise instructions executable by the processor to input the article into a virtual object provided on the display of the information handling device.

11. The information handling device of claim 7, wherein the instructions executable by the processor to receive comprise instructions executable by the processor to receive the article responsive to identifying that the information handling device is authorized to receive the article.

12. A product, comprising:
a storage device that stores code, the code being executable by a processor of an augmented reality device and comprising:
code that detects a user command to select an article of virtual data displayed on a display screen of another device, wherein the article is within a field of view of the augmented reality device and wherein the user command is a gesture command;
code that communicates, to the another device, an intention to select the article, wherein the code that communicates comprises code that:
identifies a location of the gesture command with respect to a physical position on the display screen, wherein the physical position on the display screen corresponds to a digital position of the article; and
provides, to the another device, an indication of the physical position;
code that detects another user command to transfer the article to the augmented reality device, wherein the another user command is performed within a predetermined time of the user command;
code that communicates, to the another device, an indication of the another user command to transfer; and
code that receives, at the augmented reality device and from the another device, the article of virtual data.

* * * * *